(Model.)

S. T. BLEYER.
COMBINED FUNNEL AND GAGE ROD.

No. 248,013. Patented Oct. 11, 1881.

Attest.
Charles Pickles
H. M. Thompson
Atty

Inventor.
Sam'l Bleyer

UNITED STATES PATENT OFFICE.

SAMUEL T. BLEYER, OF ST. LOUIS, MISSOURI.

COMBINED FUNNEL AND GAGE-ROD.

SPECIFICATION forming part of Letters Patent No. 248,013, dated October 11, 1881.

Application filed April 14, 1881. (Model.)

*To all whom it may concern:*

Be it known that I, SAMUEL T. BLEYER, a citizen of the United States, residing in the city of St. Louis, in the State of Missouri, have invented a new and useful Improvement in Self-Gaging Funnels, of which the following is a specification.

My invention relates to improvements in self-gaging funnels, in which a tabulated scale stem attached to a float is held loosely and so arranged as to raise or fall from a given point from the action of any fluid upon which the float is resting within a vessel; and the objects of my inventions or improvements are, first, to provide a funnel which will measure and indicate externally the "outs" quantity of any fluid contained in a package; second, to provide a funnel with a graduated scale attached thereto on which are figures which show externally, by means of its attachment to a float resting upon any fluid which has passed through a funnel, the number of gallons out of the vessel being filled; third, to provide a funnel with an indicating-scale attached to a float, and so arranged by a float held outside of the current of the inflowing liquid and yet inside of a vessel being filled as not to be materially affected thereby in its correct indications of the contents. I attain these objects by the mechanism illustrated in the accompanying drawings, in which—

Figure 1:
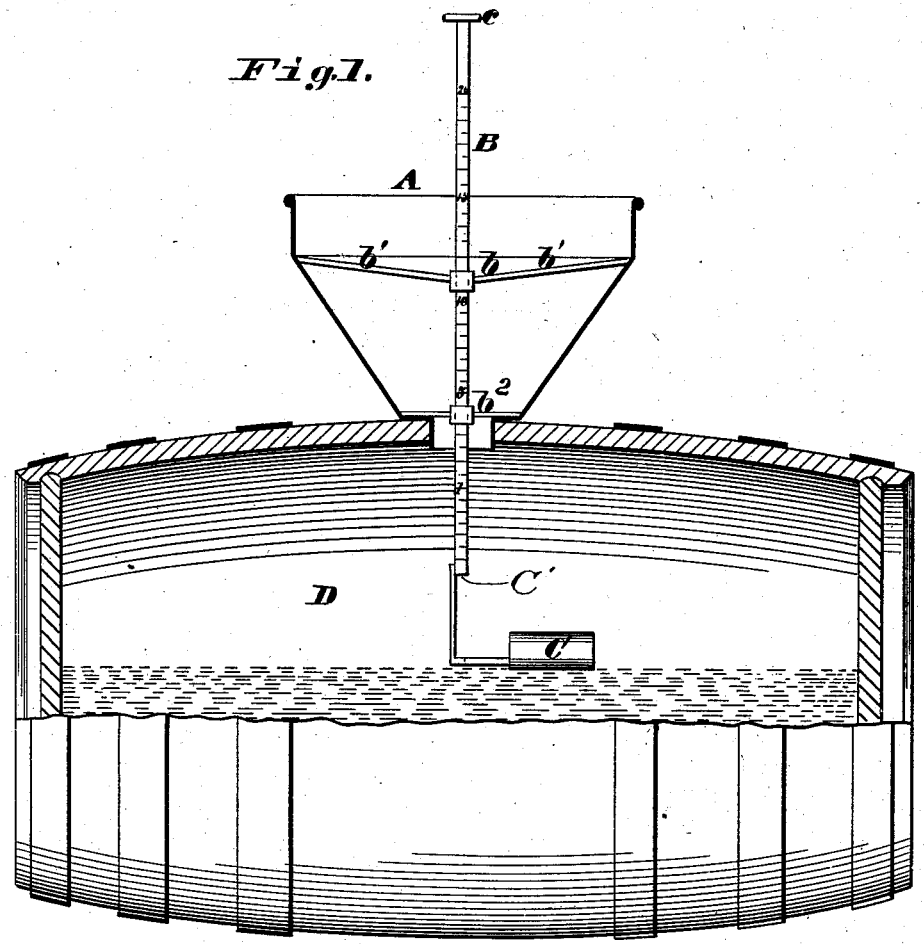
Figure 2:
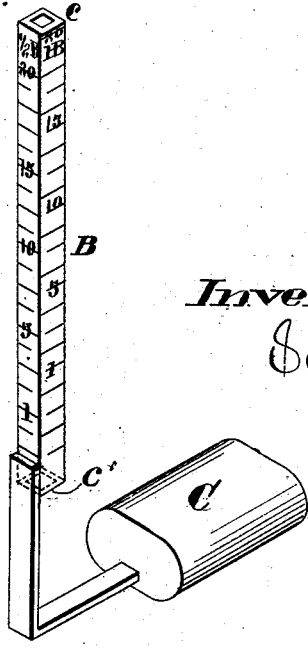

Figure 1 is a vertical sectional view of a funnel, scale-stem, and float, as in use within a barrel. Fig. 2 is a perspective view of the scale-stem and float.

Similar letters refer to similar parts in each of the views.

A in Fig. 1 represents a funnel inserted into a barrel, D. The funnel is made of metal or other suitable material and in any desirable form. Within the funnel (one near its top, the other near its bottom) are placed two four-armed stays, $b'$ $b'$ $b^2$, their arms connecting at the center of the inside diameter of the funnel and extending at right angles to each other out to the inner surface of the funnel where they are attached firmly to it, their use being to support the scaled stem of the float. At the intersection of each set of these stay-arms a square hole is made, within which the stem B, Fig. 2, of the indicating-scale is held loosely, allowing it to raise or fall, as it is affected by means of the float C (which is rigidly attached thereto) when resting upon the fluid inside of a vessel or cask, as shown in the barrel D, Fig. 1.

The stem or indicating-scale B is preferably made square and of hollow tubing, but I do not confine myself to that form. On one or more of the faces of this stem are lines and spaces marked with figures which indicate by means of its raising or lowering past a given point from its attachment to the float C the number of "outs" gallons contained in a vessel. The float C is designedly placed outside the current of the inflowing liquid. It is made of any suitable material which will float. I prefer to make them of metals, as air-tight chambers, and attached firmly to the hollow stem B, which is open at both ends for the escape of air, and holds the float so its indications externally are not disturbed.

I claim as my invention and desire to secure Letters Patent for—

1. In combination with a funnel provided with guides centrally arranged, a hollow gage-rod held in vertical position by the guides, and supported by a float which is held outside of the current passing through the funnel, substantially as described.

2. In combination with a funnel having guides, as shown, a hollow gage-rod supported by a float and held vertical by the guides, and having its ends open to permit the exit of air from a closed vessel, substantially as shown, and for the purposes set forth.

SAM. T. BLEYER.

Witnesses:
   A. L. COGGESHALE,
   H. M. THOMPSON.